US012746601B2

(12) United States Patent
Kenworthy et al.

(10) Patent No.: US 12,746,601 B2
(45) Date of Patent: Sep. 29, 2026

(54) EXCHANGEABLE BEAM ENTRY WINDOW FOR AM SYSTEM

(71) Applicant: Divergent Technologies, Inc., Los Angeles, CA (US)

(72) Inventors: Michael Thomas Kenworthy, Rancho Palos Verdes, CA (US); Krzysztof Artysiewicz, Los Angeles, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 942 days.

(21) Appl. No.: 17/857,716

(22) Filed: Jul. 5, 2022

(65) Prior Publication Data

US 2023/0008319 A1 Jan. 12, 2023

Related U.S. Application Data

(60) Provisional application No. 63/218,846, filed on Jul. 6, 2021.

(51) Int. Cl.

| | |
|---|---|
| ***B22F 10/28*** | (2021.01) |
| ***B22F 10/36*** | (2021.01) |
| ***B22F 12/00*** | (2021.01) |
| ***B22F 12/41*** | (2021.01) |
| ***B22F 12/45*** | (2021.01) |
| ***B22F 12/70*** | (2021.01) |
| *B33Y 10/00* | (2015.01) |
| *B33Y 30/00* | (2015.01) |

(52) U.S. Cl.

CPC .............. *B22F 10/28* (2021.01); *B22F 10/36* (2021.01); *B22F 12/38* (2021.01); *B22F 12/41* (2021.01); *B22F 12/45* (2021.01); *B22F 12/70* (2021.01); *B33Y 10/00* (2014.12); *B33Y 30/00* (2014.12)

(58) Field of Classification Search

CPC ........ B22F 10/28; B22F 10/36; B22F 10/362; B22F 10/364; B22F 10/366; B22F 10/368; B22F 12/38; B22F 12/41; B22F 12/45; B22F 12/70; B33Y 10/00; B33Y 30/00; B23K 26/342

See application file for complete search history.

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |

(Continued)

FOREIGN PATENT DOCUMENTS

| | | | |
|---|---|---|---|
| KR | 10-0709036 | B1 | 4/2007 |
| WO | 1996036455 | A1 | 11/1996 |

(Continued)

OTHER PUBLICATIONS

US 9,202,136 B2, 12/2015, Schmidt et al. (withdrawn)

(Continued)

*Primary Examiner* — Justin C Dodson
(74) *Attorney, Agent, or Firm* — ArentFox Schiff LLP

(57) ABSTRACT

Methods and apparatuses for replaceable beam entry windows in additive manufacturing systems are disclosed.

27 Claims, 9 Drawing Sheets

(56) References Cited

U.S. PATENT DOCUMENTS

| | | | |
|---|---|---|---|
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |
| 9,802,108 | B2 | 10/2017 | Aders |
| 9,809,977 | B2 | 11/2017 | Carney et al. |
| 9,817,922 | B2 | 11/2017 | Glunz et al. |
| 9,818,071 | B2 | 11/2017 | Jung et al. |
| 9,821,339 | B2 | 11/2017 | Paschkewitz et al. |
| 9,821,411 | B2 | 11/2017 | Buller et al. |
| 9,823,143 | B2 | 11/2017 | Twelves, Jr. et al. |
| 9,829,564 | B2 | 11/2017 | Bruder et al. |
| 9,846,933 | B2 | 12/2017 | Yuksel |
| 9,854,828 | B2 | 1/2018 | Langeland |
| 9,858,604 | B2 | 1/2018 | Apsley et al. |
| 9,862,833 | B2 | 1/2018 | Hasegawa et al. |
| 9,862,834 | B2 | 1/2018 | Hasegawa et al. |
| 9,863,885 | B2 | 1/2018 | Zaretski et al. |
| 9,870,629 | B2 | 1/2018 | Cardno et al. |
| 9,879,981 | B1 | 1/2018 | Dehghan Niri et al. |
| 9,884,663 | B2 | 2/2018 | Czinger et al. |
| 9,898,776 | B2 | 2/2018 | Apsley et al. |
| 9,914,150 | B2 | 3/2018 | Pettersson et al. |

(56) References Cited

U.S. PATENT DOCUMENTS 9,919,360 B2 3/2018 Buller et al.
9,931,697 B2 4/2018 Levin et al.
9,933,031 B2 4/2018 Bracamonte et al.
9,933,092 B2 4/2018 Sindelar
9,957,031 B2 5/2018 Golshany et al.
9,958,535 B2 5/2018 Send et al.
9,962,767 B2 5/2018 Buller et al.
9,963,978 B2 5/2018 Johnson et al.
9,971,920 B2 5/2018 Derakhshani et al.
9,976,063 B2 5/2018 Childers et al.
9,987,792 B2 6/2018 Flitsch et al.
9,988,136 B2 6/2018 Tiryaki et al.
9,989,623 B2 6/2018 Send et al.
9,990,565 B2 6/2018 Rhoads et al.
9,994,339 B2 6/2018 Colson et al.
9,996,890 B1 6/2018 Cinnamon et al.
9,996,945 B1 6/2018 Holzer et al.
10,002,215 B2 6/2018 Dowski et al.
10,006,156 B2 6/2018 Kirkpatrick
10,011,089 B2 7/2018 Lyons et al.
10,011,685 B2 7/2018 Childers et al.
10,012,532 B2 7/2018 Send et al.
10,013,777 B2 7/2018 Mariampillai et al.
10,015,908 B2 7/2018 Williams et al.
10,016,852 B2 7/2018 Broda
10,016,942 B2 7/2018 Mark et al.
10,017,384 B1 7/2018 Greer et al.
10,018,576 B2 7/2018 Herbsommer et al.
10,022,792 B2 7/2018 Srivas et al.
10,022,912 B2 7/2018 Kia et al.
10,027,376 B2 7/2018 Sankaran et al.
10,029,415 B2 7/2018 Swanson et al.
10,040,239 B2 8/2018 Brown, Jr.
10,046,412 B2 8/2018 Blackmore
10,048,769 B2 8/2018 Selker et al.
10,052,712 B2 8/2018 Blackmore
10,052,820 B2 8/2018 Kemmer et al.
10,055,536 B2 8/2018 Maes et al.
10,058,764 B2 8/2018 Aders
10,058,920 B2 8/2018 Buller et al.
10,061,906 B2 8/2018 Nilsson
10,065,270 B2 9/2018 Buller et al.
10,065,361 B2 9/2018 Susnjara et al.
10,065,367 B2 9/2018 Brown, Jr.
10,068,316 B1 9/2018 Holzer et al.
10,071,422 B2 9/2018 Buller et al.
10,071,525 B2 9/2018 Susnjara et al.
10,072,179 B2 9/2018 Drijfhout
10,074,128 B2 9/2018 Colson et al.
10,076,875 B2 9/2018 Mark et al.
10,076,876 B2 9/2018 Mark et al.
10,081,140 B2 9/2018 Paesano et al.
10,081,431 B2 9/2018 Seack et al.
10,086,568 B2 10/2018 Snyder et al.
10,087,320 B2 10/2018 Simmons et al.
10,087,556 B2 10/2018 Gallucci et al.
10,099,427 B2 10/2018 Mark et al.
10,100,542 B2 10/2018 GangaRao et al.
10,100,890 B2 10/2018 Bracamonte et al.
10,107,344 B2 10/2018 Bracamonte et al.
10,108,766 B2 10/2018 Druckman et al.
10,113,600 B2 10/2018 Bracamonte et al.
10,118,347 B2 11/2018 Stauffer et al.
10,118,579 B2 11/2018 Lakic
10,120,078 B2 11/2018 Bruder et al.
10,124,546 B2 11/2018 Johnson et al.
10,124,570 B2 11/2018 Evans et al.
10,137,500 B2 11/2018 Blackmore
10,138,354 B2 11/2018 Groos et al.
10,144,126 B2 12/2018 Krohne et al.
10,145,110 B2 12/2018 Carney et al.
10,151,363 B2 12/2018 Bracamonte et al.
10,152,661 B2 12/2018 Kieser
10,160,278 B2 12/2018 Coombs et al.
10,161,021 B2 12/2018 Lin et al.
10,166,752 B2 1/2019 Evans et al.
10,166,753 B2 1/2019 Evans et al.
10,171,578 B1 1/2019 Cook et al.
10,173,255 B2 1/2019 TenHouten et al.
10,173,327 B2 1/2019 Kraft et al.
10,178,800 B2 1/2019 Mahalingam et al.
10,179,640 B2 1/2019 Wilkerson
10,183,330 B2 1/2019 Buller et al.
10,183,478 B2 1/2019 Evans et al.
10,189,187 B2 1/2019 Keating et al.
10,189,240 B2 1/2019 Evans et al.
10,189,241 B2 1/2019 Evans et al.
10,189,242 B2 1/2019 Evans et al.
10,190,424 B2 1/2019 Johnson et al.
10,195,693 B2 2/2019 Buller et al.
10,196,539 B2 2/2019 Boonen et al.
10,197,338 B2 2/2019 Melsheimer
10,200,677 B2 2/2019 Trevor et al.
10,201,932 B2 2/2019 Flitsch et al.
10,201,941 B2 2/2019 Evans et al.
10,202,673 B2 2/2019 Lin et al.
10,204,216 B2 2/2019 Nejati et al.
10,207,454 B2 2/2019 Buller et al.
10,209,065 B2 2/2019 Estevo, Jr. et al.
10,210,662 B2 2/2019 Holzer et al.
10,213,837 B2 2/2019 Kondoh
10,214,248 B2 2/2019 Hall et al.
10,214,252 B2 2/2019 Schellekens et al.
10,214,275 B2 2/2019 Goehlich
10,220,575 B2 3/2019 Reznar
10,220,881 B2 3/2019 Tyan et al.
10,221,530 B2 3/2019 Driskell et al.
10,226,900 B1 3/2019 Nevins
10,232,550 B2 3/2019 Evans et al.
10,234,342 B2 3/2019 Moorlag et al.
10,237,477 B2 3/2019 Trevor et al.
10,252,335 B2 4/2019 Buller et al.
10,252,336 B2 4/2019 Buller et al.
10,254,499 B1 4/2019 Cohen et al.
10,257,499 B2 4/2019 Hintz et al.
10,259,044 B2 4/2019 Buller et al.
10,268,181 B1 4/2019 Nevins
10,269,225 B2 4/2019 Velez
10,272,860 B2 4/2019 Mohapatra et al.
10,272,862 B2 4/2019 Whitehead
10,275,564 B2 4/2019 Ridgeway et al.
10,279,580 B2 5/2019 Evans et al.
10,285,219 B2 5/2019 Fetfatsidis et al.
10,286,452 B2 5/2019 Buller et al.
10,286,603 B2 5/2019 Buller et al.
10,286,961 B2 5/2019 Hillebrecht et al.
10,289,263 B2 5/2019 Troy et al.
10,289,875 B2 5/2019 Singh et al.
10,291,193 B2 5/2019 Dandu et al.
10,294,552 B2 5/2019 Liu et al.
10,294,982 B2 5/2019 Gabrys et al.
10,295,989 B1 5/2019 Nevins
10,303,159 B2 5/2019 Czinger et al.
10,307,824 B2 6/2019 Kondoh
10,310,197 B1 6/2019 Droz et al.
10,313,651 B2 6/2019 Trevor et al.
10,315,252 B2 6/2019 Mendelsberg et al.
10,336,050 B2 7/2019 Susnjara
10,337,542 B2 7/2019 Hesslewood et al.
10,337,952 B2 7/2019 Bosetti et al.
10,339,266 B2 7/2019 Urick et al.
10,343,330 B2 7/2019 Evans et al.
10,343,331 B2 7/2019 McCall et al.
10,343,355 B2 7/2019 Evans et al.
10,343,724 B2 7/2019 Polewarczyk et al.
10,343,725 B2 7/2019 Martin et al.
10,350,823 B2 7/2019 Rolland et al.
10,356,341 B2 7/2019 Holzer et al.
10,356,395 B2 7/2019 Holzer et al.
10,357,829 B2 7/2019 Spink et al.
10,357,957 B2 7/2019 Buller et al.
10,359,756 B2 7/2019 Newell et al.
10,369,629 B2 8/2019 Mendelsberg et al.
10,382,739 B1 8/2019 Rusu et al.

(56) References Cited

U.S. PATENT DOCUMENTS

| | | | |
|---|---|---|---|
| 10,384,393 | B2 | 8/2019 | Xu et al. |
| 10,384,416 | B2 | 8/2019 | Cheung et al. |
| 10,389,410 | B2 | 8/2019 | Brooks et al. |
| 10,391,710 | B2 | 8/2019 | Mondesir |
| 10,392,097 | B2 | 8/2019 | Pham et al. |
| 10,392,131 | B2 | 8/2019 | Deck et al. |
| 10,393,315 | B2 | 8/2019 | Tyan |
| 10,400,080 | B2 | 9/2019 | Ramakrishnan et al. |
| 10,401,832 | B2 | 9/2019 | Snyder et al. |
| 10,403,009 | B2 | 9/2019 | Mariampillai et al. |
| 10,406,750 | B2 | 9/2019 | Barton et al. |
| 10,412,283 | B2 | 9/2019 | Send et al. |
| 10,416,095 | B2 | 9/2019 | Herbsommer et al. |
| 10,421,496 | B2 | 9/2019 | Swayne et al. |
| 10,421,863 | B2 | 9/2019 | Hasegawa et al. |
| 10,422,478 | B2 | 9/2019 | Leachman et al. |
| 10,425,793 | B2 | 9/2019 | Sankaran et al. |
| 10,427,364 | B2 | 10/2019 | Alves |
| 10,429,006 | B2 | 10/2019 | Tyan et al. |
| 10,434,573 | B2 | 10/2019 | Buller et al. |
| 10,435,185 | B2 | 10/2019 | Divine et al. |
| 10,435,773 | B2 | 10/2019 | Liu et al. |
| 10,436,038 | B2 | 10/2019 | Buhler et al. |
| 10,438,407 | B2 | 10/2019 | Pavanaskar et al. |
| 10,440,351 | B2 | 10/2019 | Holzer et al. |
| 10,442,002 | B2 | 10/2019 | Benthien et al. |
| 10,442,003 | B2 | 10/2019 | Symeonidis et al. |
| 10,449,696 | B2 | 10/2019 | Elgar et al. |
| 10,449,737 | B2 | 10/2019 | Johnson et al. |
| 10,461,810 | B2 | 10/2019 | Cook et al. |
| 2006/0108783 | A1 | 5/2006 | Ni et al. |
| 2011/0259862 | A1 | 10/2011 | Scott et al. |
| 2013/0154160 | A1* | 6/2013 | Cooper ................. B29C 64/135 425/150 |
| 2014/0277669 | A1 | 9/2014 | Nardi et al. |
| 2016/0136756 | A1 | 5/2016 | Ogura et al. |
| 2017/0113344 | A1 | 4/2017 | Schönberg |
| 2017/0120334 | A1 | 5/2017 | Demuth et al. |
| 2017/0341143 | A1 | 11/2017 | Abe et al. |
| 2017/0341309 | A1 | 11/2017 | Piepenbrock et al. |
| 2018/0304526 | A1 | 10/2018 | Feller et al. |
| 2018/0345375 | A1* | 12/2018 | Van Vaerenbergh ... B22F 10/32 |
| 2019/0366638 | A1* | 12/2019 | Buller ................... B29C 64/371 |
| 2020/0361140 | A1* | 11/2020 | Chimmalgi ........... B29C 64/135 |
| 2021/0023654 | A1* | 1/2021 | Norman ................. B33Y 10/00 |
| 2021/0141313 | A1 | 5/2021 | De Sugny et al. |
| 2021/0170494 | A1* | 6/2021 | Mamrak ................. B22F 12/70 |
| 2022/0161328 | A1* | 5/2022 | Van Haendel ........ B29C 64/393 |

FOREIGN PATENT DOCUMENTS

| | | | |
|---|---|---|---|
| WO | 1996036525 | A1 | 11/1996 |
| WO | 1996038260 | A1 | 12/1996 |
| WO | 2003024641 | A1 | 3/2003 |
| WO | 2004108343 | A1 | 12/2004 |
| WO | 2005093773 | A1 | 10/2005 |
| WO | 2007003375 | A1 | 1/2007 |
| WO | 2007110235 | A1 | 10/2007 |
| WO | 2007110236 | A1 | 10/2007 |
| WO | 2008019847 | A1 | 2/2008 |
| WO | 2007128586 | A3 | 6/2008 |
| WO | 2008068314 | A2 | 6/2008 |
| WO | 2008086994 | A1 | 7/2008 |
| WO | 2008087024 | A1 | 7/2008 |
| WO | 2008107130 | A1 | 9/2008 |
| WO | 2008138503 | A1 | 11/2008 |
| WO | 2008145396 | A1 | 12/2008 |
| WO | 2009083609 | A2 | 7/2009 |
| WO | 2009098285 | A1 | 8/2009 |
| WO | 2009112520 | A1 | 9/2009 |
| WO | 2009135938 | A1 | 11/2009 |
| WO | 2009140977 | A1 | 11/2009 |
| WO | 2010125057 | A2 | 11/2010 |
| WO | 2010125058 | A1 | 11/2010 |
| WO | 2010142703 | A2 | 12/2010 |
| WO | 2011032533 | A1 | 3/2011 |
| WO | 2014016437 | A1 | 1/2014 |
| WO | 2014187720 | A1 | 11/2014 |
| WO | 2014195340 | A1 | 12/2014 |
| WO | 2015193331 | A1 | 12/2015 |
| WO | 2016116414 | A1 | 7/2016 |
| WO | 2017036461 | A1 | 3/2017 |
| WO | 2018/147868 | A1 | 8/2018 |
| WO | 2018195362 | A1 | 10/2018 |
| WO | 2018234984 | A1 | 12/2018 |
| WO | 2019030248 | A1 | 2/2019 |
| WO | 2019042504 | A1 | 3/2019 |
| WO | 2019048010 | A1 | 3/2019 |
| WO | 2019048498 | A1 | 3/2019 |
| WO | 2019048680 | A1 | 3/2019 |
| WO | 2019048682 | A1 | 3/2019 |
| WO | 2020018308 | A1 | 1/2020 |

OTHER PUBLICATIONS

US 9,809,265 B2, 11/2017, Kinjo (withdrawn)

US 10,449,880 B2, 10/2019, Mizobata et al. (withdrawn)

Extended European Search Report received for European Patent Application No. 22838316.2, mailed on May 26, 2025, 8 pages.

International Search Report and Written Opinion in PCT/US2022/036150, mailed Oct. 11, 2022, 11 pages.

Office Action received for Chinese Patent Application No. 202280060345.9, mailed on Jun. 30, 2026, 19 pages (9 pages of English Translation and 10 pages of Original Document).

* cited by examiner

EXCHANGEABLE BEAM ENTRY WINDOW FOR AM SYSTEM

CROSS-REFERENCE TO RELATED APPLICATIONS

The present disclosure claims the benefit under 35 U.S.C. 119 of U.S. Provisional Patent Application No. 63/218,846, filed Jul. 6, 2021 and entitled "EXCHANGEABLE BEAM ENTRY WINDOW FOR AM SYSTEM", which application is incorporated by reference herein in its entirety.

BACKGROUND

Field

The present disclosure relates generally to additive manufacturing (AM), and more specifically to exchangeable beam entry windows for AM systems.

Description of the Related Technology

Some Additive Manufacturing (AM) processes involve the use of a stored geometrical model for accumulating layered materials on a "build plate" to produce three-dimensional (3-D) objects having features defined by the model. AM techniques are capable of printing complex parts or components using a wide variety of materials. A 3-D object is fabricated based on a computer-aided design (CAD) model. The AM process can manufacture a solid three-dimensional object directly from the CAD model without additional tooling.

One example of an AM process is powder bed fusion (PBF), which uses a laser, electron beam, or other source of energy to sinter or melt powder deposited in a powder bed, thereby consolidating powder particles together in targeted areas to produce a 3-D structure having the desired geometry. Different materials or combinations of materials, such as metals, plastics, and ceramics, may be used in PBF to create the 3-D object. Other AM techniques, including those discussed further below, are also available or under current development, and each may be applicable to the present disclosure.

Another example of an AM process is called Binder Jet (BJ) process that uses a powder bed (similar to PBF) in which metallic powder is spread in layers and bonded by using an organic binder. The resulting part is a green part which requires burning off the binder and sintering to consolidate the layers into full density. The metallic powder material can have the same chemical composition and similar physical characteristics as PBF powders.

Another example of an AM process is called Directed Energy Deposition (DED). DED is an AM technology that uses a laser, electron beam, plasma, or other method of energy supply, such as those in Tungsten Inert Gas (TIG), or Metal Inert Gas (MIG) welding to melt the metallic powder, wire, or rod, thereby transforming it into a solid metal object. Unlike many AM technologies, DED is not based on a powder bed. Instead, DED uses a feed nozzle to propel the powder or mechanical feed system to deliver powder, wire, or rod into the laser beam, electron beam, plasma beam, or other energy stream. The powdered metal or the wire or rod are then fused by the respective energy beam. While supports or a freeform substrate may in some cases be used to maintain the structure being built, almost all the raw material (powder, wire, or rod) in DED is transformed into solid metal, and consequently, little waste powder is left to recycle. Using a layer by layer strategy, the print head, comprised of the energy beam or stream and the raw material feed system, can scan the substrate to deposit successive layers directly from a CAD model.

PBF, BJ, DED, and other AM processes may use various raw materials such as metallic powders, wires, or rods. The raw material may be made from various metallic materials. Metallic materials may include, for example, aluminum, or alloys of aluminum. It may be advantageous to use alloys of aluminum that have properties that improve functionality within AM processes. For example, particle shape, powder size, packing density, melting point, flowability, stiffness, porosity, surface texture, density electrostatic charge, as well as other physical and chemical properties may impact how well an aluminum alloy performs as a material for AM. Similarly, raw materials for AM processes can be in the form of wire or rod whose chemical composition and physical characteristics may impact the performance of the material. Some alloys may impact one or more of these or other traits that affect the performance of the alloy for AM.

One or more aspects of the present disclosure may be described in the context of the related technology. None of the aspects described herein are to be construed as an admission of prior art, unless explicitly stated herein.

SUMMARY

Several aspects of the present disclosure are described herein.

An apparatus in accordance with an aspect of the present disclosure may comprise a build chamber having an enclosure, the enclosure having an opening, a module configured to fit within the opening, the module including a beam window, the beam window having a characteristic, an energy source that generates an energy beam, an optical element configured to direct the energy beam through the beam window, and a controller, coupled to the energy source, wherein the controller controls the energy source based at least in part on the characteristic of the beam window.

Such an apparatus may optionally include other features, such as a memory, coupled to the controller, wherein the memory stores the characteristic associated with the module the characteristic including an optical caustic, the characteristic including a beam propagation ratio, the energy source being a laser energy source, the controller being further coupled to the module, and wherein the controller is configured to identify the module and select the characteristic from a memory based on an identification of the module.

Such an apparatus may optionally include other features, such as the module engaging with the opening such that the beam window is located at a consistent distance from the optical element, a gas supply system configured to supply a positively pressured gas around the optical element, a removable separator configured to be positioned between the optical element and the opening, a seal arranged between the module and the opening, the seal configured to maintain an environment in the build chamber, and a forced loading mechanism configured to positively engage and locate the module.

Such an apparatus may optionally include other features, such as the module including a plurality of beam windows, and the optical element being further configured to direct a plurality of energy beams such that each energy beam of the plurality of energy beams is directed through a separate beam window in the plurality of beam windows, and each of the plurality of beam entry windows being separately removable.

A method in accordance with an aspect of the present disclosure may comprise enclosing a build chamber with an enclosure, the enclosure having an opening, placing a module within the opening, the module including a beam window, the beam window having a characteristic, generating an energy beam, directing the energy beam through the beam window with an optical element, and controlling the energy beam based at least in part on the characteristic of the beam window.

Such a method further optionally includes other features, such as storing the characteristic of the beam window in a memory, the characteristic including an optical caustic, the characteristic including a beam propagation ratio, and the energy beam being a laser.

Such a method further optionally includes other features, such as identifying the module and selecting the characteristic based on an identification of the module, locating the beam window at a consistent distance from the optical element, supplying a positively pressured gas around the optical element, positioning a removable separator between the optical element and the opening, sealing the module in the opening to maintain an environment in the build chamber, positively engaging the module within the opening, installing a plurality of beam windows into the module; and directing a plurality of energy beams with the optical element, such that each energy beam of the plurality of energy beams is directed through a separate beam window in the plurality of beam windows, and each beam window of the plurality of beam windows is separately removable.

It will be understood that other aspects of exchangeable beam entry windows for additive manufacturing systems will become readily apparent to those of ordinary skill in the art from the following detailed description, wherein it is shown and described only several embodiments by way of illustration. As will be realized by those of ordinary skill in the art, the manufactured structures and the methods for manufacturing these structures are capable of other and different embodiments, and its several details are capable of modification in various other respects, all without departing from the disclosure. Accordingly, the drawings and detailed description are to be regarded as illustrative in nature and not as restrictive.

BRIEF DESCRIPTION OF THE DRAWINGS

Various aspects of exchangeable beam entry windows for additive manufacturing systems are presented in the detailed description by way of example, and not by way of limitation, in the accompanying drawings, wherein.

DETAILED DESCRIPTION

Figure 1A:
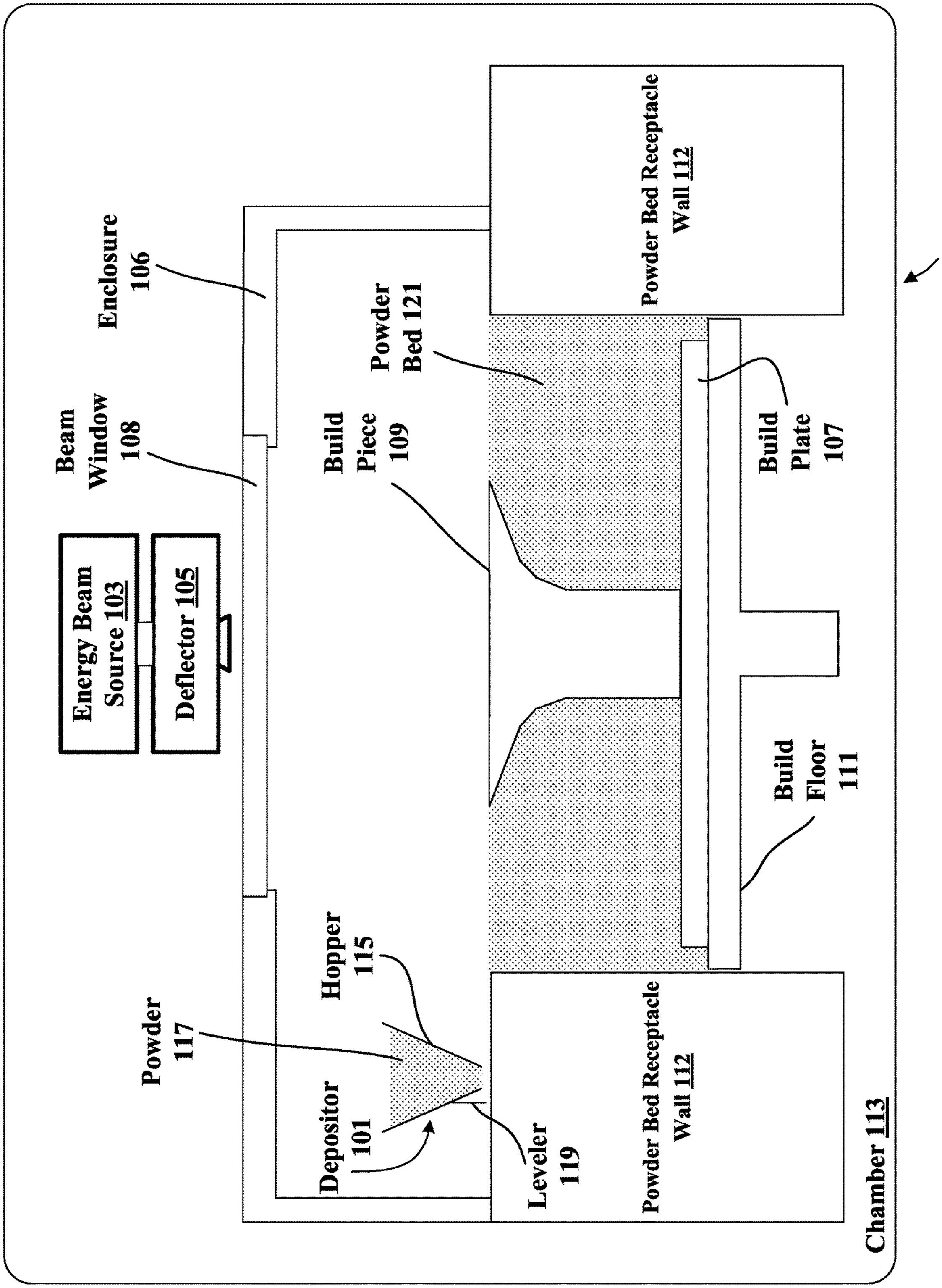
FIGS. 1A-1D illustrate respective side views of a 3-D printer system in accordance with an aspect of the present disclosure.

The detailed description set forth below in connection with the appended drawings is intended to provide a description of various exemplary embodiments are not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those of ordinary skill in the art. However, the techniques and approaches of the present disclosure may be practiced without these specific details. In some instances, well-known structures and components may be shown in block diagram form, or omitted entirely, in order to avoid obscuring the various concepts presented throughout this disclosure.

FIGS. 1A-D illustrate respective side views of an exemplary 3-D printer system.

In this example, the 3-D printer system is a powder-bed fusion (PBF) system 100. FIGS. 1A-D show PBF system 100, which may be considered as an apparatus, during different stages of operation. The particular embodiment of an apparatus as illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein.

PBF System 100 may be an electron-beam PBF system 100, a laser PBF system 100, or other type of PBF system 100. Further, other types of 3-D printing, such as Directed Energy Deposition, Selective Laser Melting, Binder Jet, etc., may be employed without departing from the scope of the present disclosure.

PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 may also include an enclosure 106 and a beam window 108 (also referred to as a beam entry window herein) that separates energy beam source 103 and deflector 105 from other portions of PBF system 100. Enclosure 106 may, for example, allow for a more sterile environment for fusing, e.g., nitrogen purging, reduced oxidation, etc. Beam window 108 may allow transmission of the energy beam from energy beam source 103, as selectively deflected by deflector 105, to be applied to the powder material in PBF system 100 while maintaining a different environment within enclosure 106.

PBF system 100 can also include a build floor 111 positioned within a powder bed receptacle. The walls 112 of the powder bed receptacle generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

AM processes may produce various support structures that need to be removed. The particular embodiments illustrated in FIGS. 1A-D are some suitable examples of a PBF system employing principles of the present disclosure. Specifically, support structures and methods to remove them described herein may be used in at least one PBF system 100 described in FIGS. 1A-D. While one or more methods described in the present disclosure may be suitable for various AM processes (e.g., using a PBF system, as shown in FIGS. 1A-D), it will be appreciated that one or more methods of the present disclosure may be suitable for other applications, as well. For example, one or more methods described herein may be used in other fields or areas of manufacture without departing from the scope of the present disclosure. Accordingly, AM processes employing the one or more methods of the present disclosure are to be regarded as illustrative, and are not intended to limit the scope of the present disclosure.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
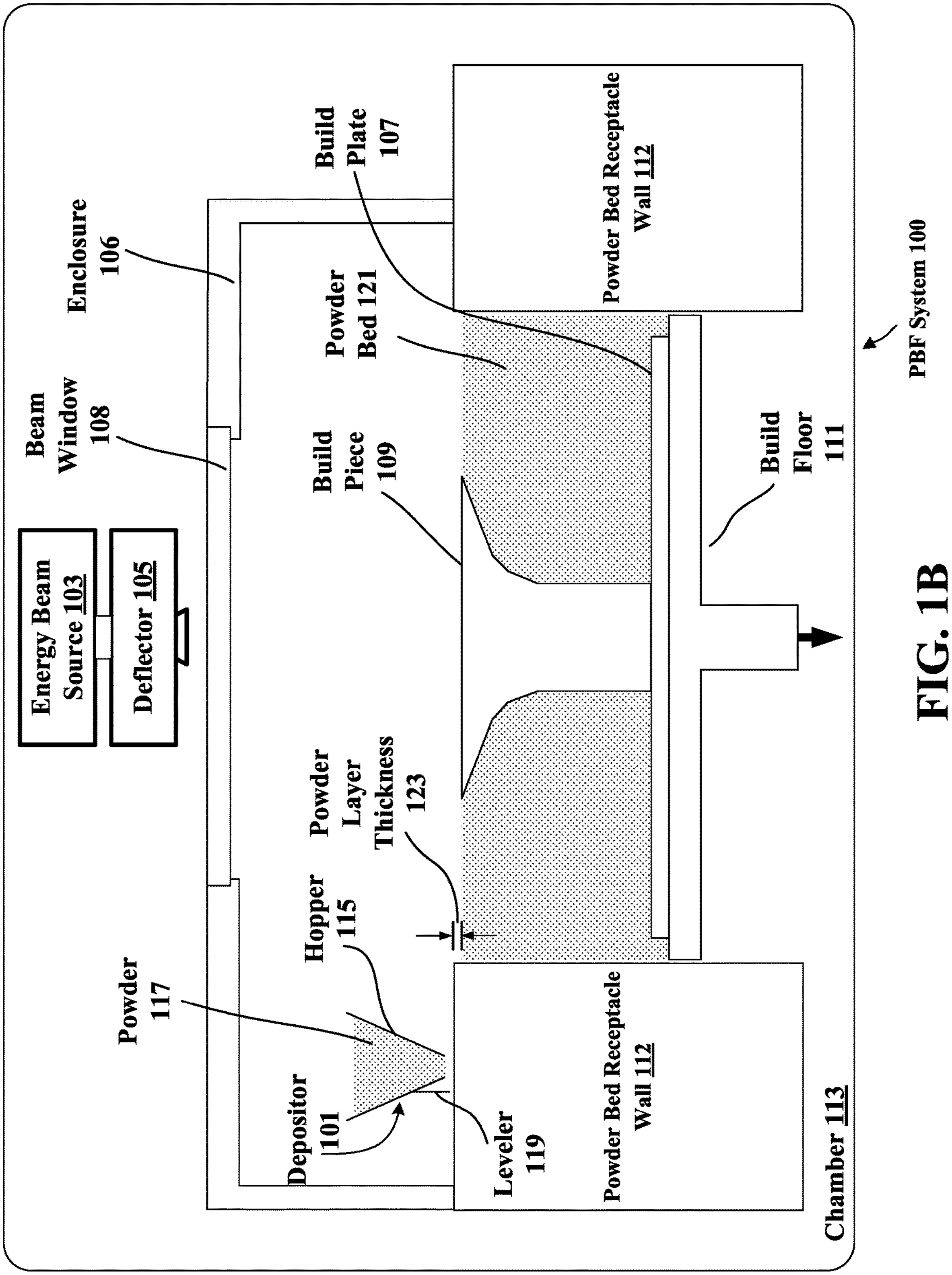

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
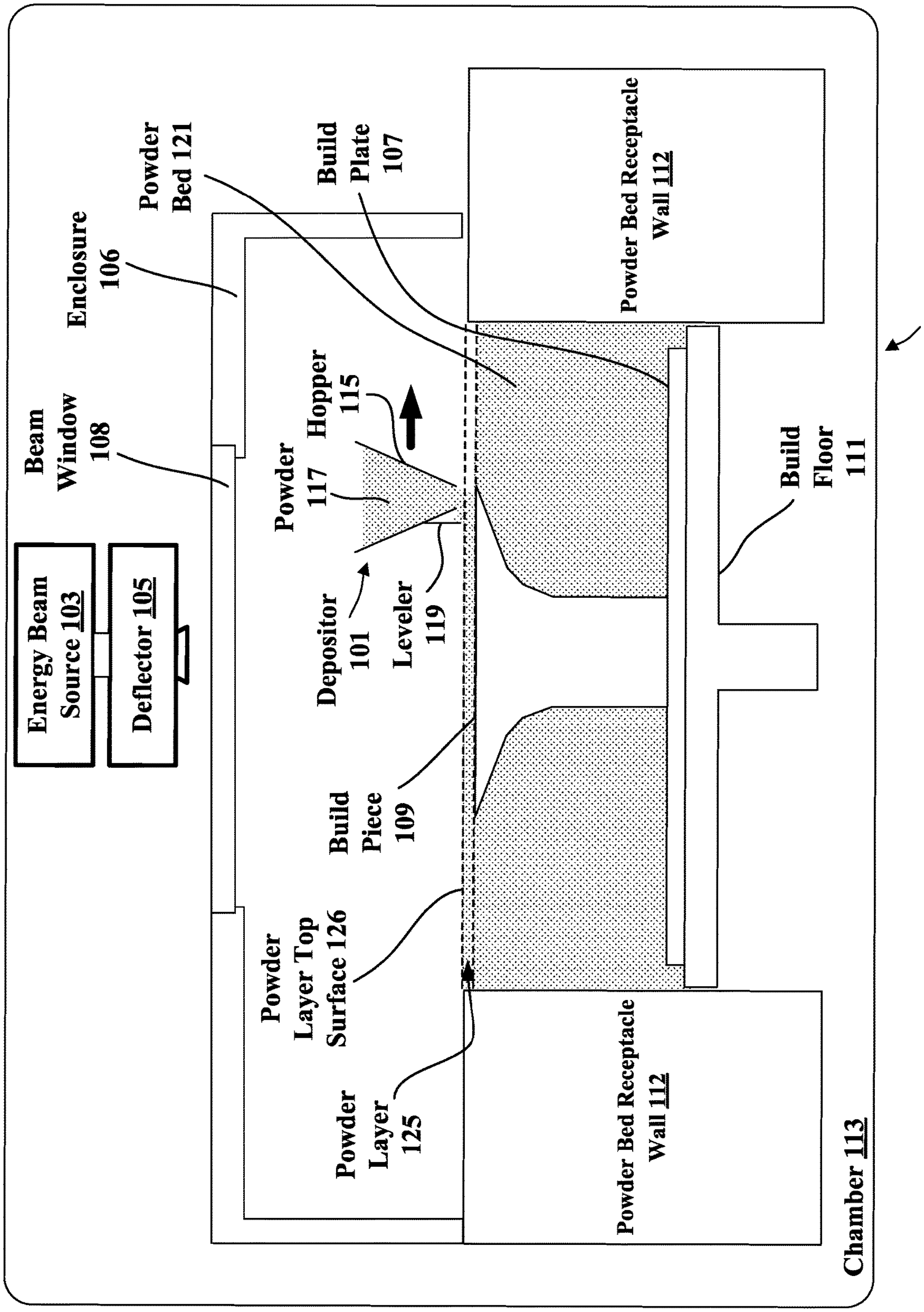

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B) and exposing powder layer top surface 126. Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed herein with reference to FIG. 1A.

Figure 1D:
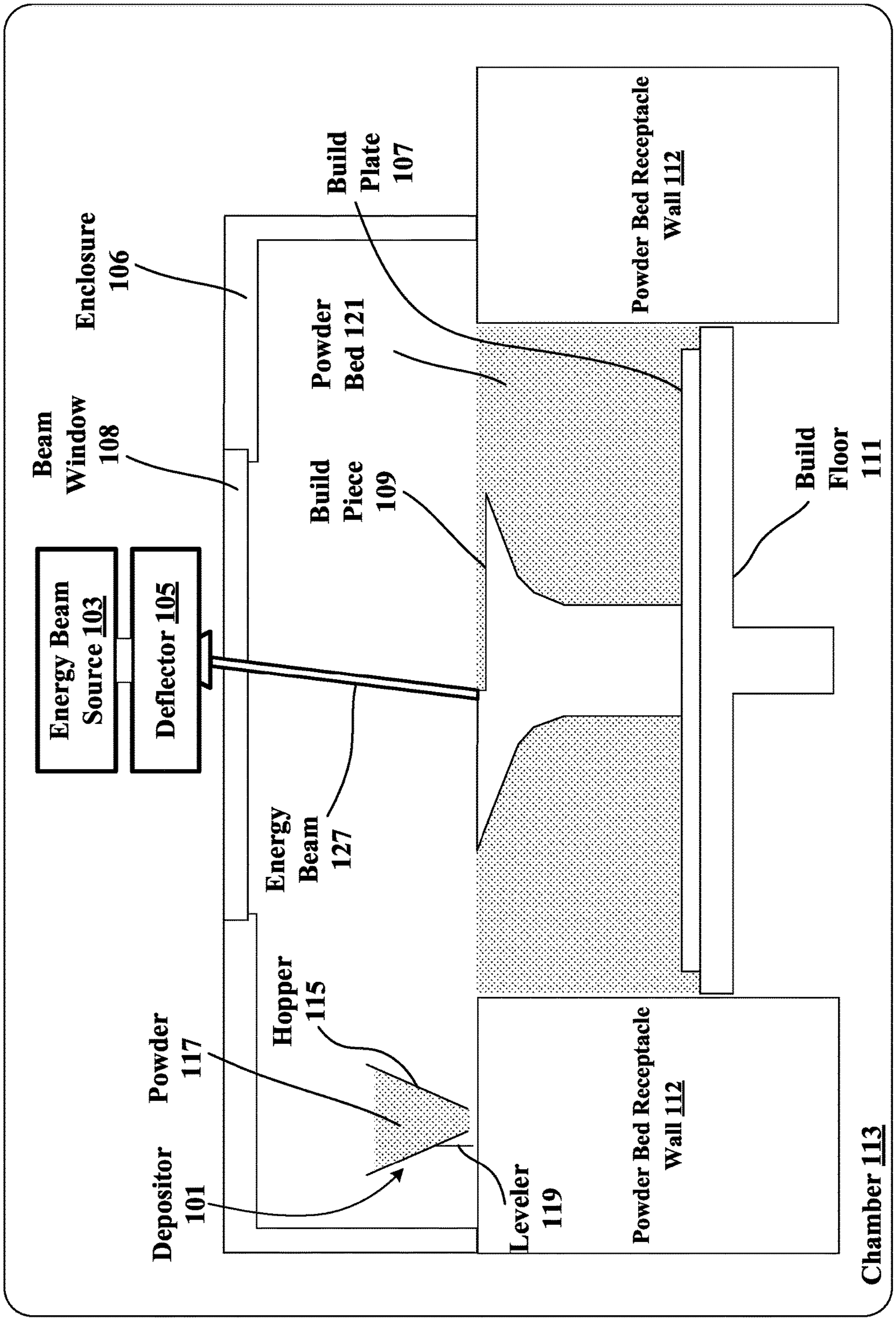

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
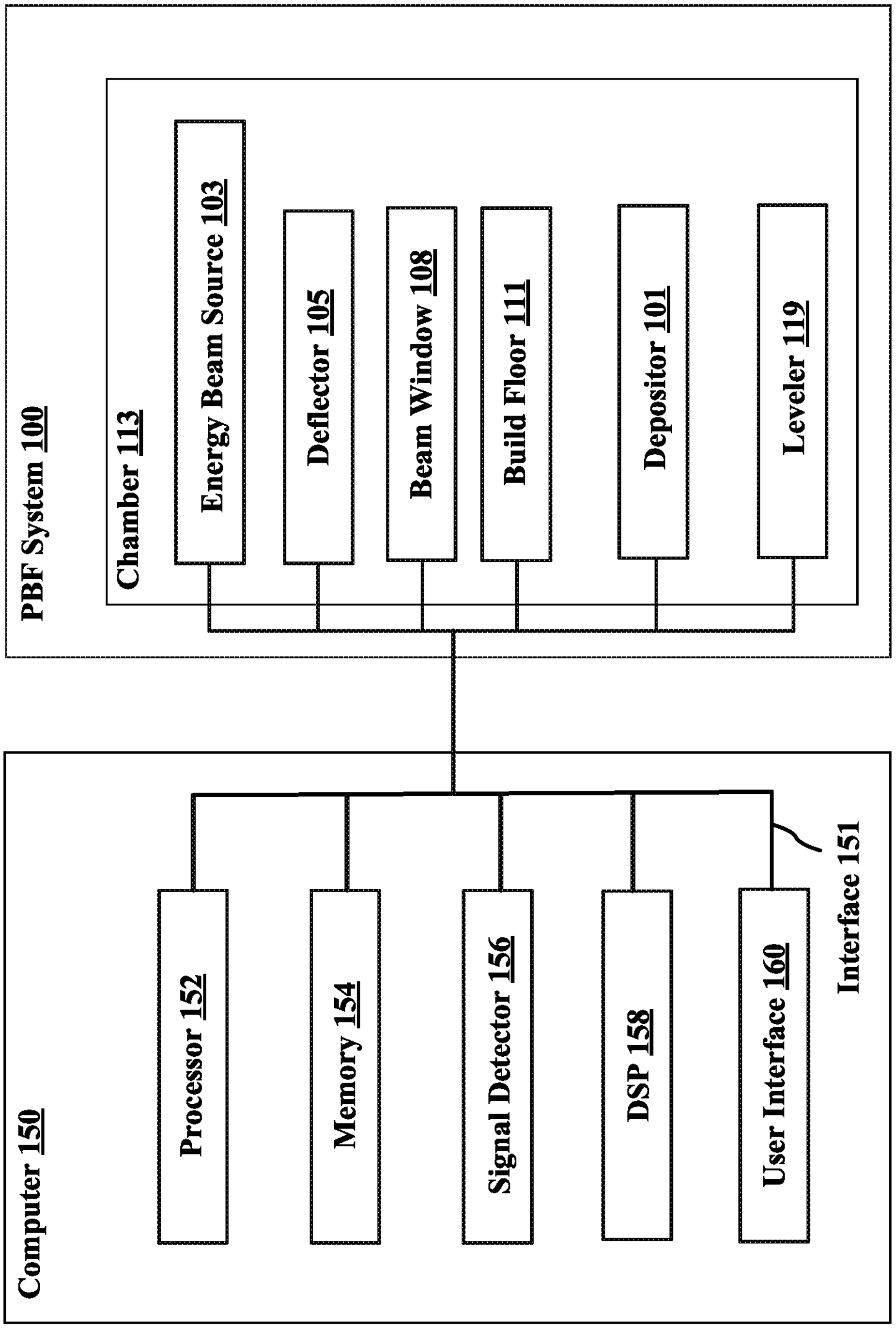
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor 152, memory 154, signal detector 156, a digital signal processor (DSP) 158, and one or more user interfaces 160. Computer 150 may include additional components without departing from the scope of the present disclosure.

Processor 152 may assist in the control and/or operation of PBF system 100. The processor 152 may also be referred to as a central processing unit (CPU). Memory 154, which may include both read-only memory (ROM) and random access memory (RAM), may provide instructions and/or data to the processor 152. A portion of the memory 154 may also include non-volatile random access memory (NVRAM). The processor 152 typically performs logical and arithmetic operations based on program instructions stored within the memory 154. The instructions in the memory 154 may be executable (by the processor 152, for example) to implement the methods described herein.

The processor 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

Signal detector 156 may be used to detect and quantify any level of signals received by the computer 150 for use by the processor 152 and/or other components of the computer 150. The signal detector 156 may detect such signals as energy beam source 103 power, deflector 105 position, beam window 108 characteristics, build floor 111 height, amount of powder 117 remaining in depositor 101, leveler 119 position, and other signals. DSP 158 may be used in processing signals received by the computer 150. The DSP 158 may be configured to generate instructions and/or packets of instructions for transmission to PBF system 100.

The user interface 160 may comprise a keypad, a pointing device, and/or a display. The user interface 160 may include any element or component that conveys information to a user of the computer 150 and/or receives input from the user.

The various components of the computer 150 may be coupled together by interface 151, which may include, e.g., a bus system. The interface 151 may include a data bus, for example, as well as a power bus, a control signal bus, and a status signal bus in addition to the data bus. Components of the computer 150 may be coupled together or accept or provide inputs to each other using some other mechanism.

In an aspect of the present disclosure, computer 150 may store and/or receive information related to beam window 108. Such information may include calibration information (also known as "caustics"), time since replacement, identifying information, and/or other information related to one or more beam windows 108 used in PBF system 100.

Although a number of separate components are illustrated in FIG. 1E, one or more of the components may be combined or commonly implemented. For example, the processor 152 may be used to implement not only the functionality described herein with respect to the processor 152, but also to implement the functionality described herein with respect to the signal detector 156, the DSP 158, and/or the user interface 160. Further, each of the components illustrated in FIG. 1E may be implemented using a plurality of separate elements.

Figure 2:
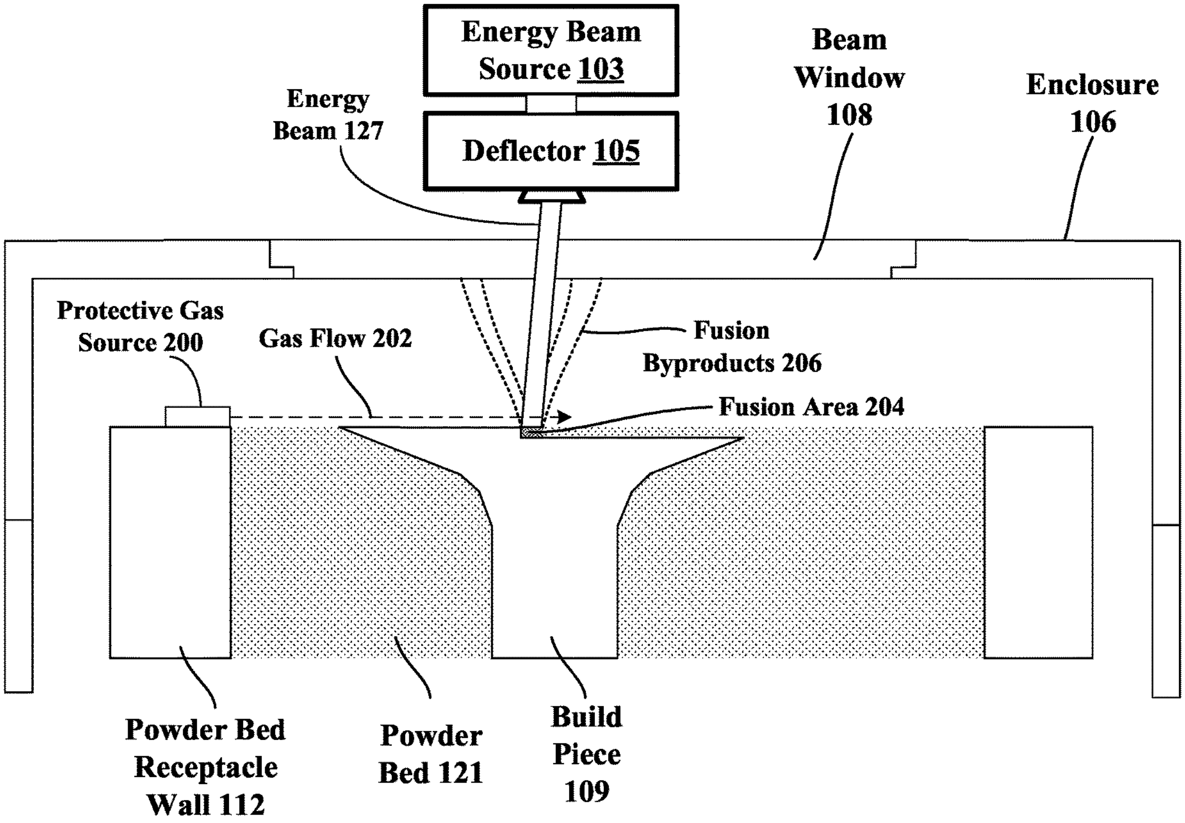
FIG. 2 illustrates a cross-sectional view of a 3-D printer system.

FIG. 2 illustrates a cross-sectional view of a 3-D printer system.

As described with respect to FIGS. 1A-1D, PBF system 100 may include a beam entry window 108. Enclosure 106 and beam window 108 may provide a protective cover within PBF system 100, to allow for fusing of powder bed 121 in a controlled environment. The controlled environment may provide a non-oxidizing gas, e.g., nitrogen, argon, etc., within enclosure 106 to allow for fusing of powder bed 121 without creation of metal oxides. Metal oxides formed within build piece 109 during fusing may reduce the overall strength of build piece 109, or create weak spots within build piece 109.

As shown in FIG. 2, Protective gas source 200 provides gas flow 202 that helps shield fusion area 204 from oxidizing materials. This shielding process may be similar to welding processes known as metal inert gas (MIG) welding (also known as gas metal arc welding (GMAW)) or tungsten inert gas (TIG) welding (also known as gas tungsten arc welding (GTAW)). The inert gas from protective gas source 200 surrounds or floods the fusion area 204 during fusion of the powder bed 121, and as the powder cools the gas flow 202 reduces or eliminates the possibility any oxygen in the enclosure 106 from binding with the molten metals in fusion area 204 as they become part of build piece 109.

However, fusion of the powder in powder bed 121 creates fusion byproducts 206 as the powder in powder bed 121 is being fused in fusion area 204. Fusion of the powder bed 121 may also generate fusion byproducts 206 from other areas of build piece 109 as those areas of build piece 109 cool down after fusion. Fusion byproducts 206 may include, for example, particulates such as soot from the fusing process. The fusion byproducts 206 may deposit on the beam window 108, which may degrade PBF system 100 performance.

In PBF system 100, to maintain transmission of energy beam 127, beam window 108 is cleaned in place within PBF system 100. Beam window 108 may be cleaned using isopropyl alcohol and a specific cleaning sequence. Many PBF systems 100 have multiple beam windows 108. Manual cleaning of beam window 108 is time consuming and labor intensive, which results in PBF system 100 being unavailable for manufacturing during the cleaning process. Further, since access to beam windows 108 may be limited, e.g., depending on the placement or location of beam window 108 within PBF system 100, manual cleaning of beam window 108 may not be an efficient and/or repeatable process.

Figure 3:
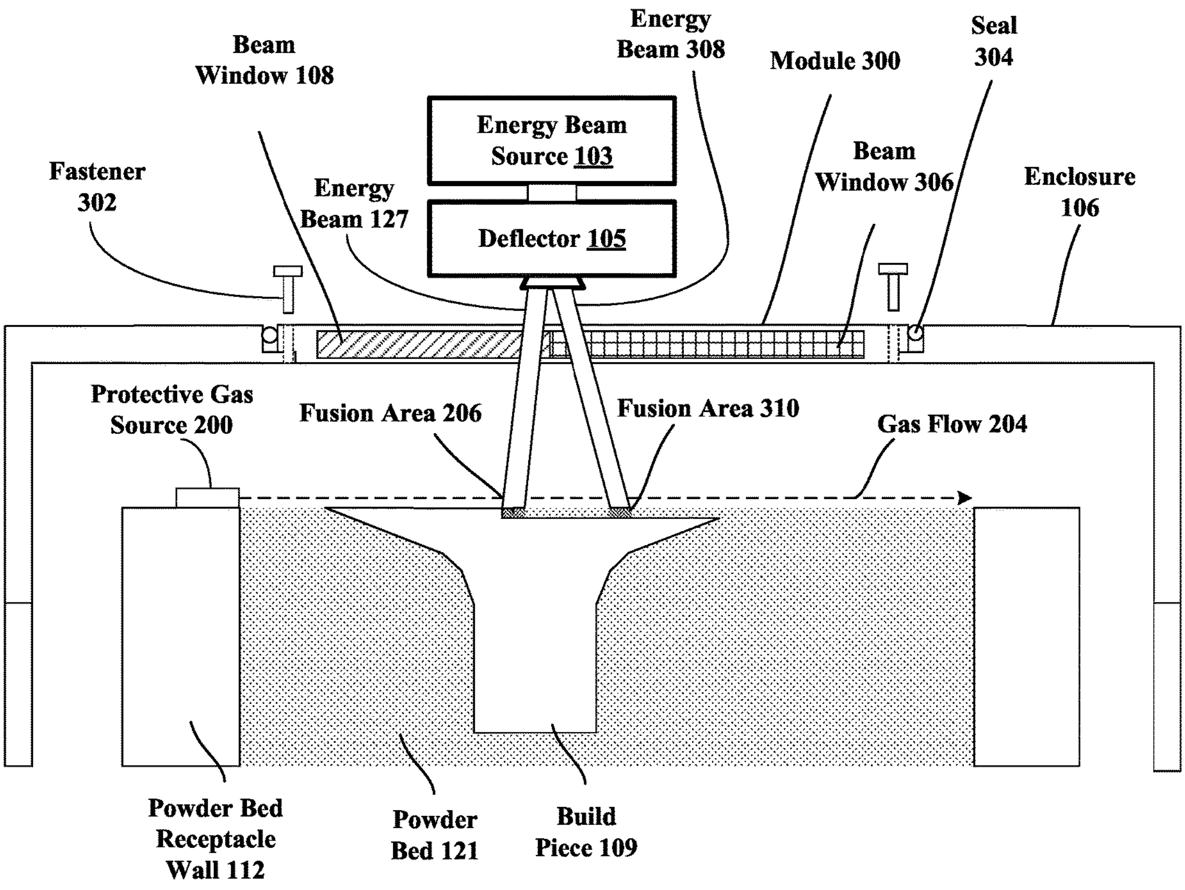
FIG. 3 illustrates a cross-sectional view of a beam entry window in accordance with an aspect of the present disclosure.

FIG. 3 illustrates a cross-sectional view of a beam entry window in accordance with an aspect of the present disclosure.

As shown in FIG. 3, module 300 is coupled to enclosure 106. Module 300 may be coupled to enclosure 106 through the use of one or more fasteners 302. Module 300 is configured to fit within an opening of enclosure 106. Module 300 may also be sealed within the opening of enclosure 106 with one or more seals 304. Seal 304 may be arranged to provide a pressure seal between module 300 and enclosure 106.

Module 300 may be removed from enclosure 106 to facilitate cleaning of a beam window 108 included as part of module 300. Fasteners 302, which may be thumbscrews, captive hardware, or other fastening devices, may allow for precise, repeatable placement of module 300 within enclosure 106. For example, and not by way of limitation, module 300 may be repeatably placed in the opening of enclosure 106 via fasteners 302 such that beam window 108 is placed at a consistent distance from deflector 105, energy beam source 103, or other optical components. Fasteners 302, alone or in conjunction with module 300, may provide a forced loading mechanism between module 300 and enclosure 106.

Module 300 and fasteners 302 may be placed such that module 300 can only be installed into enclosure 106 in certain orientations, or a single orientation if desired. Fasteners 302 and/or module 300 may positively engage with enclosure 106 using springs, locking devices, pressure elements, etc. to repeatably place module 300 in enclosure 106.

Seal 304 may be employed to maintain environmental conditions within enclosure 106, i.e., where powder bed 121 is located. Such environmental conditions may include pressure of the environment, cleanliness of the environment, or other desired conditions to allow for additive manufacturing within enclosure 106.

In an aspect of the present disclosure, module 300 may include beam window 108 and one or more beam windows 306. Additional energy beams, such as energy beam 308, may also be generated by energy beam source 103 and/or directed by deflector 105 to allow for multiple fusion areas, e.g., fusion area 204 and fusion area 310, such that build piece 109 may be printed more efficiently.

In an aspect of the present disclosure, beam window 108 and beam window 306 may be removed from module 300 separately. In an aspect of the present disclosure, one or more beam windows 108 may be attached in a more permanent fashion to module 300, while one or more beam windows 108 may be removable from a given module 300.

Beam window 108 and beam window 306 may have different caustics, different beam propagation ratios, and/or other characteristics. Each beam window 108 may have associated characteristics, and may be placed within a given location within PBF system 100. The associated characteristics and location may be known and stored in memory 154 and used by computer 150 when energy beams are generated by energy beam source 103 and/or directed by deflector 105. Each module 300 may contain one beam window 108, two beam windows 108 and 306, or any number of beam windows without departing from the scope of the present disclosure. Each module 300 may be known or identified based on one or more factors, e.g., serial number, characteristics, identification tag, etc., without departing from the scope of the present disclosure.

Figure 4:
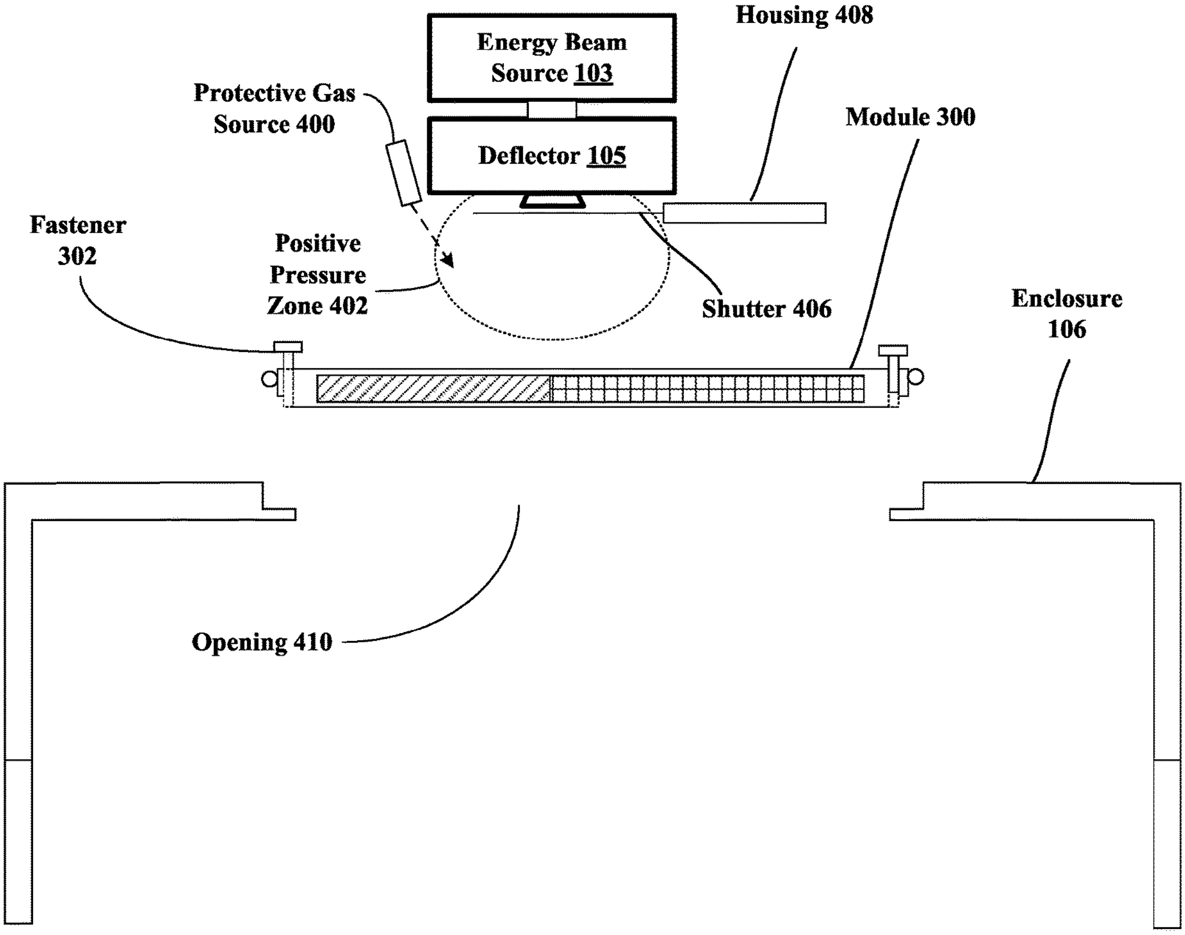
FIG. 4 illustrates removal of a beam entry window in accordance with an aspect of the present disclosure.

FIG. 4 illustrates removal of a beam entry window in accordance with an aspect of the present disclosure.

When module 300 is removed, e.g., through loosening of fasteners 302 that couple module 300 to enclosure 106, in an aspect of the present disclosure the optical elements of energy beam source 103 and/or deflector 105 may be exposed to particulates and the environment within enclosure 106.

In an aspect of the present disclosure, the optical elements of energy beam source 103 and deflector 105 may be partially or completely shielded from the environment within enclosure 106 in one or more ways. For example, and not by way of limitation, a protective gas source 400, which may be a gas supply system, gas bottle supply, or other gas supply, may provide a positive pressure zone 402 around the optical elements of deflector 105 by flowing a protective gas, e.g., nitrogen, argon, etc., around the optical elements of energy beam source 103 and/or deflector 105. The positive pressure zone 402 may encompass all of the energy beam source 103 and/or deflector 105, or may just encompass portions of those components, in order to reduce the exposure of any optical elements from particulate or other contamination.

In an aspect of the present disclosure, either in addition to or in place of the positive pressure zone 402, a shutter 406 may extend from a housing 408 to cover the optical elements of energy beam source 103 and/or deflector 105. The shutter 406 and/or positive pressure zone 402 may be placed in between the optical elements and the enclosure prior to removal of module 300. Shutter 406 may be a film, solid plate, or other barrier that separates the optical elements from any particulate matter that may be disturbed during movement of module 300.

Module 300 may be removed from opening 410 in enclosure 106, and replaced with another module 300 that has been cleaned and prepared for use in PBF system 100. The characteristics of the incoming module 300, e.g., caustics, beam propagation ratios, etc., may be known by PBF system 100, and read directly from electrical connections to module 300, or may be entered into computer 150 by a system operator. The module 300 removed from opening 410 may then be cleaned in a location that facilitates proper cleaning of module 300 and beam window 108. As such, the module 300, which includes a beam window 108 is exchanged with a different module 300 having a beam window 108. The characteristics of the module 300 being used by PBF system 100 are used, at least in part, to determine energy beam source 103 power, deflector 105 speed, etc. for fusion of a build piece 109.

Figure 5:
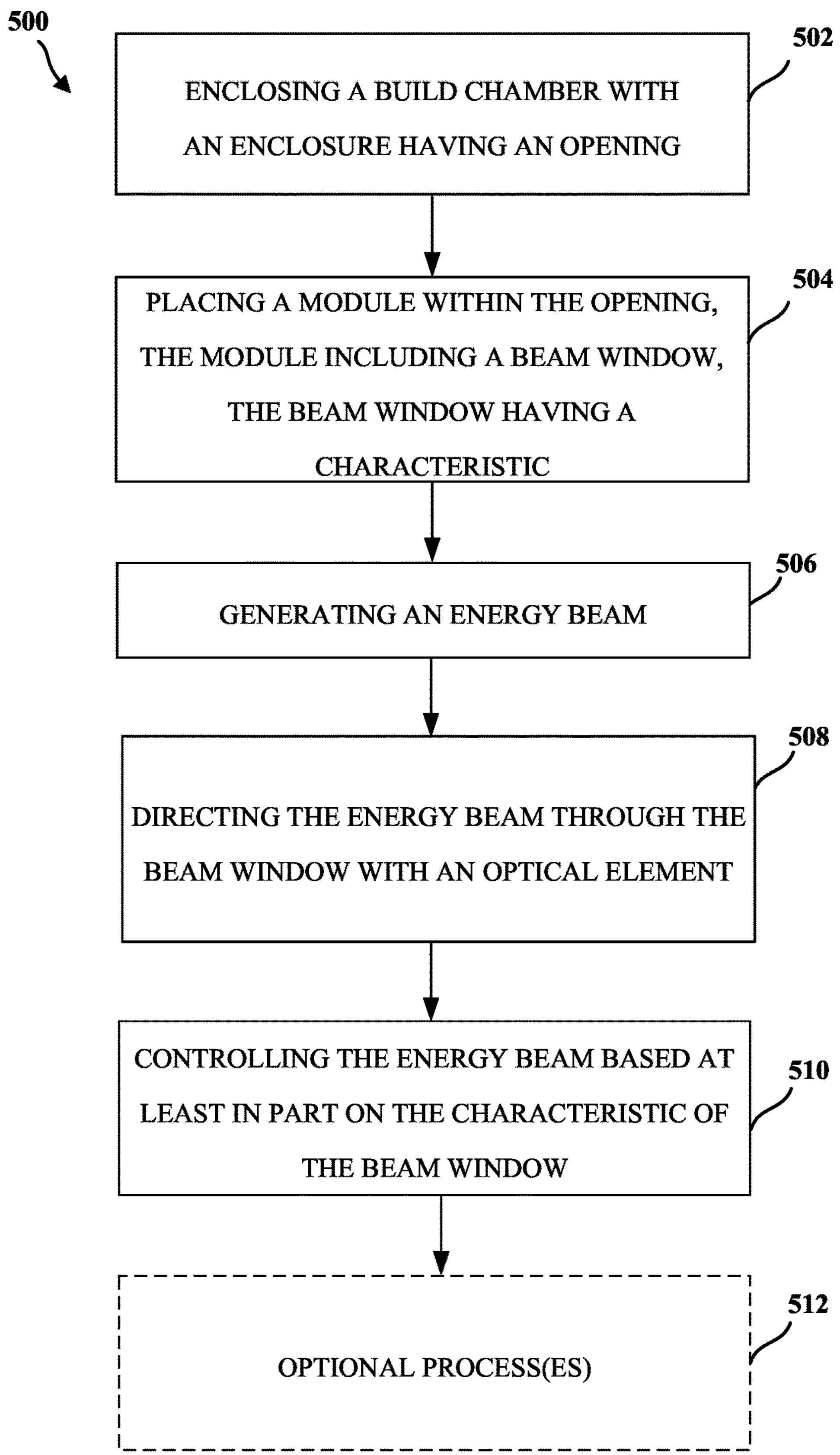
FIG. 5 illustrates a flow diagram showing an exemplary method in accordance with an aspect of the present disclosure.

FIG. 5 illustrates a flow diagram showing an exemplary method in accordance with an aspect of the present disclosure.

The objects that perform, at least in part, the exemplary functions of FIG. 5 may include, for example, computer 150 and one or more components therein, a three-dimensional printer, such as illustrated in FIGS. 1A-E, and other objects that may be used for forming the above-referenced materials.

It should be understood that the steps identified in FIG. 5 are exemplary in nature, and a different order or sequence of steps, and additional or alternative steps, may be undertaken as contemplated in this disclosure to arrive at a similar result. Flow diagram 500 should be not be considered a limiting example of the present disclosure.

At 502, a build chamber is enclosed with an enclosure, the enclosure having an opening. An enclosure in accordance with 502 is shown as enclosure 106 having opening 410.

At 504, a module is placed within the opening, the module including a beam window, the beam window having a characteristic. A module in accordance with 504 is shown as module 300.

Optional addition to 504 may be the storing the characteristic of the beam window in a memory, the characteristic being a caustic, the characteristic being a propagation ratio, identifying the module and selecting the characteristic based on an identification of the module, locating the beam window at a consistent distance from the optical element, supplying a positively pressured gas around the optical element, positioning a removable separator between the optical element and the opening, sealing the module in the opening to maintain an environment in the build chamber, positively engaging the module within the opening, installing a plurality of beam windows into the module; and directing a plurality of energy beams with the optical element, such that each energy beam of the plurality of energy beams is directed through a separate beam window in the plurality of beam windows, and each beam window of the plurality of beam windows is separately removable.

At 506, an energy beam may be generated. An energy beam in accordance with 506 is shown as energy beam 127. Optional additions to 506 may include the energy beam being a laser.

At 508, the energy beam is directed through the beam window with an optical element. Optional additions to 506 may include locating the beam window at a consistent distance from the optical element.

At 510, the energy beam is controlling based at least in part on the characteristic of the beam window.

At 512, optional processes may be included. Optional processes that may be part of 512 may include supplying a positively pressured gas around the optical element, positioning a removable separator between the optical element and the opening, sealing the module in the opening to maintain an environment in the build chamber, positively engaging the module within the opening, installing a plurality of beam windows into the module, and directing a plurality of energy beams with the optical element, such that each energy beam of the plurality of energy beams is directed through a separate beam window in the plurality of beam windows, and each beam window of the plurality of beam windows being separately removable.

The previous description is provided to enable any person ordinarily skilled in the art to practice the various aspects described herein. Various modifications to these exemplary embodiments presented throughout this disclosure will be readily apparent to those of ordinary skill in the art, and the concepts disclosed herein may be applied to additive manufacturing in many aspects. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for additive manufacturing, comprising:
- a build chamber having an enclosure, the enclosure having an opening;
- a module configured to fit within the opening, the module including a plurality of beam windows with different characteristics, and the module being removable from the enclosure;
- an energy source that generates a plurality of energy beams;
- an optical element configured to direct the plurality of energy beams through the plurality of beam windows; and
- a controller, coupled to the energy source, wherein the controller controls the energy source.

2. The apparatus of claim 1, further comprising a memory, coupled to the controller, wherein the memory stores the different characteristics of the plurality of beam windows.

3. The apparatus of claim 1, wherein the different characteristics of the plurality of beam windows includes at least one optical caustic of at least one beam window of the plurality of beam windows.

4. The apparatus of claim 1, wherein the different characteristics of the plurality of beam windows includes at least one beam propagation ratio of at least one beam window of the plurality of beam windows.

5. The apparatus of claim 1, wherein the energy source is a laser energy source.

6. The apparatus of claim 1, wherein the controller is further coupled to the module, and wherein the controller is configured to:
- identify the module; and
- select the different characteristics of the plurality of beam windows from a memory based on an identification of the module, wherein the controller controls the energy source based at least in part on the different characteristics of the plurality of beam windows.

7. The apparatus of claim 1, wherein the module engages with the opening such that the plurality of beam windows are located at a consistent distance from the optical element.

8. The apparatus of claim 1, further comprising:
- a gas supply system configured to supply a positively pressured gas around the optical element.

9. The apparatus of claim 1, further comprising:
- an extendable shutter configured to be positioned between the optical element and the opening.

10. The apparatus of claim 1, further comprising:
- a seal arranged between the module and the opening, the seal configured to maintain an environment in the build chamber.

11. The apparatus of claim 1, further comprising:
- one or more fasteners, wherein the one or more fasteners positively engage and locate the module in the enclosure.

12. The apparatus of claim 1, wherein the optical element is further configured to direct the plurality of energy beams such that each energy beam of the plurality of energy beams is directed through a separate beam window of the plurality of beam windows.

13. The apparatus of claim 12, wherein each of the plurality of beam windows is separately removable.

14. A method of additive manufacturing, comprising:
- enclosing a build chamber with an enclosure, the enclosure having an opening;
- placing a module within the opening, the module including a plurality of beam windows with different characteristics, and the module being removable from the enclosure;
- generating a plurality of energy beams;
- directing the plurality of energy beams through the plurality of beam windows with an optical element; and
- controlling the plurality of energy beams.

15. The method of claim 14, further comprising storing the different characteristics of the plurality of beam windows in a memory.

16. The method of claim 15, wherein the different characteristics of the plurality of beam windows includes at least one optical caustic of at least one beam window of the plurality of beam windows.

17. The method of claim 14, wherein the different characteristics of the plurality of beam windows includes at least one beam propagation ratio of at least one beam window of the plurality of beam windows.

18. The method of claim 14, wherein each of the plurality of energy beams is a laser.

19. The method of claim 14, further comprising:
- identifying the module; and
- selecting the different characteristics of the plurality of beam windows from a memory based on an identification of the module, wherein the plurality of energy beams are controlled based at least in part on the different characteristics of the plurality of beam windows.

20. The method of claim 14, further comprising:
- locating the plurality of beam windows at a consistent distance from the optical element.

21. The method of claim 14, further comprising:
- supplying a positively pressured gas around the optical element.

22. The method of claim 14, further comprising:
- positioning an extendable shutter between the optical element and the opening.

23. The method of claim 14, further comprising:
sealing the module in the opening to maintain an environment in the build chamber.

24. The method of claim 14, further comprising:
positively engaging the module within the opening.

25. The method of claim 14,
wherein each energy beam of the plurality of energy beams is directed through a separate beam window of the plurality of beam windows.

26. The method of claim 25, wherein each beam window of the plurality of beam windows is separately removable.

27. The apparatus of claim 6, wherein each beam window of the plurality of beam windows has a corresponding location within the module, and the controller controls the energy source further based on the corresponding location.

* * * * *